No. 712,383.
B. A. JOULE.
GOLF CLUB.
(Application filed Sept. 16, 1902.)
Patented Oct. 28, 1902.
(No Model.)
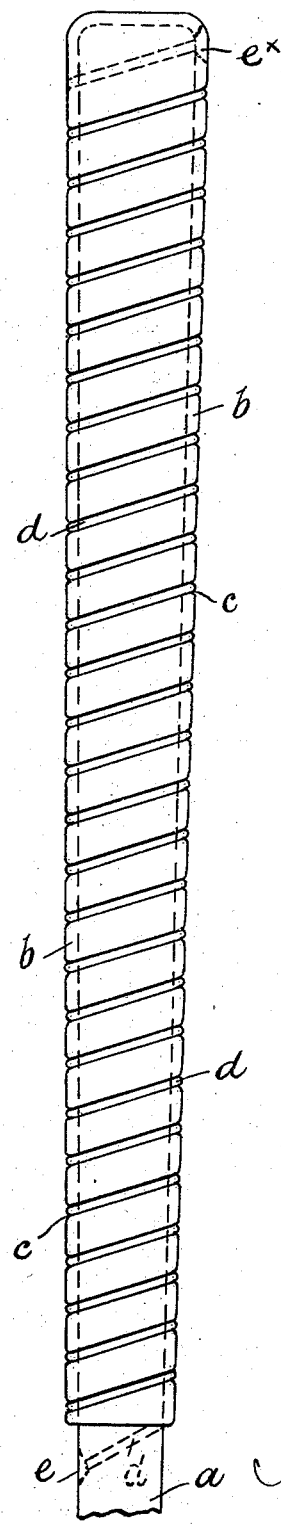
WITNESSES
Walter Abb
E. W. Collins.
INVENTOR
Benjamin Arthur Joule
BY
Howson and Howson
ATTORNEYS

UNITED STATES PATENT OFFICE.

BENJAMIN A. JOULE, OF NORTHENDEN, NEAR MANCHESTER, ENGLAND.

GOLF-CLUB.

SPECIFICATION forming part of Letters Patent No. 712,383, dated October 28, 1902.

Application filed September 16, 1902. Serial No. 123,628. (No model.)

*To all whom it may concern:*

Be it known that I, BENJAMIN ARTHUR JOULE, a subject of the King of Great Britain and Ireland, residing at Chadsden, Northenden, near Manchester, in the county of Chester, England, have invented a new and useful Improvement Applicable to the Handles of Golf-Clubs, Cricket-Bats, Rackets, and the Like, of which the following is a specification.

This invention relates to an improvement applicable, primarily, to the handles of golf-clubs and may also be applied to the handles of cricket-bats, rackets, and the like, where a firm grip is required.

The objects of my said invention are to obtain a firm grip and to neutralize the effect on the player of the concussion produced by a stroke.

In the accompanying drawings, to which I hereinafter refer, a part of the handle of a golf-club or other like article is shown with my invention applied.

The handle $a$ is covered with rubber tubing $b$, which is formed, preferably on the outside, with a spiral groove $c$ and bound around in said groove with a gutta-percha cord $d$, which is permanently fastened at both ends in the following manner: A hole $e$ oblique to the surface of the handle is bored through the shaft $a$ at one end of the handle and another hole $e^x$ in like manner at the other end. Each of these holes is chamfered or countersunk. The gutta-percha cord $d$ is inserted and drawn through one of these holes, so as to allow about one inch in length to protrude. This piece is now ignited and allowed to burn down until it reaches the chamfered hole, which it fills. It is then extinguished and left to harden. When this butted end of the gutta-percha cord is hardened, it makes a permanently-firm fastening. The gutta-percha cord is now wound or coiled closely around in the grooves in the rubber tubing already drawn on the handle and is then similarly butted in the hole $e^x$ at the other end of the handle. The depth of the grooves in the rubber tubing is such that the surface of the rubber may be flush with the surface of the cord.

In a modification of my invention I first insert the shaft $a$ in a spool of wood which fits closely to the shaft and is formed with a flange or head at the end, the one at the butt-end of the handle being preferably loose. The rubber tubing is drawn over this spool so as to be level with the flanges, and the loose flange or end is then screwed on. Each of these flanges is made with a chamfered hole, and the gutta-percha cord is then attached and wound around the india-rubber tube in the manner above described, or I may employ in like manner catgut in place of gutta-percha.

I claim as my invention—

1. A handle for golf-clubs or the like, comprising a shaft, an india-rubber cover therefor, a cord spirally coiled around said cover and secured at each end in a chamfered hole in the shaft, substantially as described.

2. A handle for golf-clubs or the like, comprising a shaft, an india-rubber cover therefor, spiral grooves in said cover, chamfered holes at each end of the shaft, a cord passed through the holes and wound around the shaft in the grooves, substantially as described.

3. A handle for golf-clubs or the like, comprising a shaft, an india-rubber cover therefor, chamfered holes in the shaft, a gutta-percha cord wound around the cover and passing through the holes and having hardened butted ends, substantially as described.

In testimony whereof I have signed my name to this specification in the presence of two subscribing witnesses.

BENJAMIN A. JOULE.

Witnesses:
GEORGE DAVIES,
JNO. HUGHES.